(12) United States Patent
Trajkovska et al.

(10) Patent No.: US 9,142,329 B2
(45) Date of Patent: Sep. 22, 2015

(54) TRANSPARENT CONDUCTIVE INK COMPOSITIONS AND THE USE THEREOF IN ELECTRO-ACTIVE OPTICAL SYSTEMS

(71) Applicant: Mitsui Chemicals, Inc., Tokyo (JP)

(72) Inventors: Anita Trajkovska, Christiansburg, VA (US); Ronald D. Blum, Roanoke, VA (US)

(73) Assignee: Mitsui Chemicals, Inc., Tokyo (JP)

( * ) Notice: Subject to any disclaimer, the term of this patent is extended or adjusted under 35 U.S.C. 154(b) by 92 days.

(21) Appl. No.: 13/622,850

(22) Filed: Sep. 19, 2012

(65) Prior Publication Data

US 2013/0083405 A1    Apr. 4, 2013

Related U.S. Application Data

(60) Provisional application No. 61/536,259, filed on Sep. 19, 2011.

(51) Int. Cl.

| | |
|---|---|
| G02F 1/29 | (2006.01) |
| G02B 3/00 | (2006.01) |
| H01B 1/12 | (2006.01) |
| H01B 1/04 | (2006.01) |
| H01B 1/24 | (2006.01) |
| G02B 1/00 | (2006.01) |
| G02B 1/10 | (2015.01) |
| G02C 7/08 | (2006.01) |

(52) U.S. Cl.
CPC ............... *H01B 1/124* (2013.01); *H01B 1/04* (2013.01); *H01B 1/125* (2013.01); *H01B 1/127* (2013.01); *H01B 1/128* (2013.01); *H01B 1/24* (2013.01); *G02B 1/002* (2013.01); *G02B 1/10* (2013.01); *G02B 1/105* (2013.01); *G02B 3/00* (2013.01); *G02B 2207/101* (2013.01); *G02C 7/083* (2013.01)

(58) Field of Classification Search
CPC .......... G02C 7/083; G02B 3/00; G02B 1/002; G02B 1/10; G02B 1/105; G02B 2207/01
USPC ............ 623/6.22; 351/159.03, 159.39, 159.4; 359/642, 319
See application file for complete search history.

(56) References Cited

U.S. PATENT DOCUMENTS 5,219,679 A * 6/1993 Abraham et al. .............. 429/310
2008/0208335 A1* 8/2008 Blum et al. ................. 623/6.22

* cited by examiner

*Primary Examiner* — Evelyn A Lester
(74) *Attorney, Agent, or Firm* — Sterne, Kessler, Goldstein & Fox, P.L.L.C.

(57) ABSTRACT

The present application relates generally to conductive compositions that are transparent to visible light and their use in various optical applications, such as ophthalmic products. Embodiments of the invention include transparent conductive ink compositions that comprise a conductive polymer and one or more of a lithium salt or a high boiling point solvent. Embodiments of the invention further include electro-active ophthalmic products, such as electro-active ophthalmic lenses, comprising one or more conductive structures (e.g., contacts, wires, and the like) that are at least partially composed of said transparent conductive ink compositions.

16 Claims, 5 Drawing Sheets

Polyacetylene

Polypyrrole

Polyphenylene

Poly(phenylene vinylene)

Polythiophene

Polyaniline

Polyacetylene    Polypyrrole    Polyphenylene

Poly(phenylene vinylene)    Polythiophene    Polyaniline

TRANSPARENT CONDUCTIVE INK COMPOSITIONS AND THE USE THEREOF IN ELECTRO-ACTIVE OPTICAL SYSTEMS

CROSS-REFERENCE TO RELATED APPLICATIONS

The present application claims the benefit of priority to U.S. Provisional Patent Application No. 61/536,259, filed Sep. 19, 2011, which is hereby incorporated by reference as though fully set forth herein.

FIELD OF THE INVENTION

The present application relates generally to conductive compositions that are transparent to visible light and their use in various optical applications, such as ophthalmic products. Embodiments of the invention include transparent conductive ink compositions that comprise a conductive polymer and one or more of a lithium salt or a high boiling point solvent. Embodiments of the invention further include electro-active ophthalmic products, such as electro-active ophthalmic lenses, comprising one or more conductive structures (e.g., contacts, wires, and the like) that are at least partially composed of said transparent conductive ink compositions.

BACKGROUND

Optically transparent materials, which can also conduct electricity, can be used in a wide range of applications, including transparent electrodes. Transparent electrodes can be used in various devices, such as displays, light emitting diodes, solar cells, dynamic ophthalmic products, and the like. Such transparent electrodes can be made by coating a transparent substrate, e.g., a glass or plastic substrate, with a film containing a metal oxide, such as indium tin oxide (ITO). ITO presents several drawbacks, however. For example, its price is increasing due to the scarcity of indium. Further, ITO-containing films can be brittle and tend to suffer degradation of their conductivity when subjected to mechanical strain, which makes it difficult to incorporate ITO-containing transparent electrodes into products where flexibility is desirable. Moreover, in some instances, ITO-containing films can develop haze over time. Thus, there is a continued need for materials from which one can form transparent conductive structures and that can overcome one or more of the disadvantages associated with ITO-based materials.

SUMMARY OF THE INVENTION

In at least one aspect, the invention provides ink compositions comprising: (a) a conductive polymer; (b) a lithium salt; and (c) a high boiling point solvent. Any suitable conductive polymers, lithium salts, and high boiling point solvents (or polar solvents) can be used. In some embodiments, the conductive polymer is a dispersion of poly(3,4-ethylenedioxythiophene) and poly(styrene sulfonate) (i.e., PEDOT:PSS). In some embodiments, the lithium salt is lithium perchlorate. In some embodiments, the high boiling point solvent is a sugar alcohol, such as sorbitol. In some embodiments, the composition further comprises carbon nanotubes (CNTs) (e.g., single-walled carbon nanotubes (SWCNTs), multi-walled carbon nanotubes (MWCNTs), or mixtures thereof).

In another aspect, the invention provides ink compositions comprising: (a) carbon nanotubes; and (b) a transparent carrier. Any suitable carbon nanotubes can be used, including SWCNTs, MWCNTs, or mixtures thereof. Any suitable transparent carrier can include aqueous media, such as water, or can include various organic solvents.

In a further aspect, the invention provides transparent conductive structures, wherein such structure is at least partially composed of an ink composition of any of the aforementioned aspects and embodiments of the invention. Any suitable structures are included. In some embodiments, the transparent conductive structures include electrical contacts, electrodes, or electrical wires.

In a further aspect, the invention provides lenses for use in an electro-optical system, the lenses comprising: (a) a first surface; (b) a second surface; (c) an edge that connects the first surface and the second surface; and (d) one or more electrical contacts or one or more electrical wires, which are disposed on the first surface, the second surface, or the edge; wherein at least one of the electrical contacts or the electrical wires is at least partially composed of an ink composition of any of the aforementioned aspects or embodiments of the invention. Such lenses can be employed in a wide array of electo-optical applications, such as electro-optical adjustable-focus lenses.

In a further aspect, the invention provides methods of forming a transparent electrical contact or a transparent electrical wire on a lens, the method comprising: (a) providing a lens that comprises a first surface, a second surface, and an edge that connects the first surface and the second surface; and (b) depositing the ink composition of any of the aforementioned aspects or embodiments of the invention onto the first surface, the second surface, or the edge of the lens. The depositing can be done by any suitable means. In some embodiments, the depositing step includes brushing, spin-coating, gravure coating, spray coating, printing, or ink jet printing.

Further aspects and embodiments of the invention are provided in the detailed description that follows and in the accompanying figures.

BRIEF DESCRIPTION OF DRAWINGS

The application includes the following figures. These figures depict certain illustrative embodiments of various aspects of the invention. The figures are not intended to limit the scope of the claimed subject matter apart from an express indication to the contrary.

DETAILED DESCRIPTION

The following description recites various aspects and embodiments of the present invention. No particular embodiment is intended to define the scope of the invention. Rather, the embodiments merely provide non-limiting examples various compositions, apparatuses, and methods that are at least included within the scope of the invention. The description is to be read from the perspective of one of ordinary skill in the art; therefore, information well known to the skilled artisan is not necessarily included.

As used herein, the articles "a," "an," and "the" include plural referents, unless expressly and unequivocally disclaimed.

As used herein, the conjunction "or" does not imply a disjunctive set. Thus, the phrase "A or B is present" includes each of the following scenarios: (a) A is present and B is not present; (b) A is not present and B is present; and (c) A and B are both present. Thus, the term "or" does not imply an either/or situation, unless expressly indicated.

As used herein, the term "comprise," "comprises," or "comprising" implies an open set, such that other elements can be present in addition to those expressly recited.

Unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

In at least one aspect, the invention provides ink compositions comprising: (a) a conductive polymer; and (b) a salt (e.g., a lithium salt) or a high boiling point solvent (e.g., a highly polar solvent). In some embodiments, the ink composition comprises a lithium salt. In some other embodiments, the ink composition comprises a high boiling point solvent. In some further embodiments, the ink composition comprises a lithium salt and a high boiling point solvent.

The addition of a lithium salt or high boiling point solvent serves to enhance the conductivity of the conductive polymer (e.g., a conjugated organic polymer, such as poly(3,4-ethylenedioxythiophene) (PEDOT)). These additives can partly dissolve the polymer stacks or can enable a more favorable conformational or morphological rearrangement of the polymer chains and clustering of gel particles. (Gel particles are known to be easily formed by the PEDOT chains, depending on certain factors, including their method of manufacture.) The smaller the gel particles, the lower the conductivity of the resulting film, as the gel particle boundaries make a significant contribution to the resistivity of the film. By adding highly polar compounds (e.g., highly polar solvents or salts), the polymer chain rearrangement is governed by the interactions between the dipoles of the organic compound and the dipoles/charges of the polymer chains. Such rearrangement can lead to decreased resistance between dried gel particles and their clustering, thereby increasing the conductivity of the film.

As used herein, the term "conductive polymer" refers to an organic conjugated polymer having a conductivity of at least 1 $\Omega^{-1}cm^{-1}$. In some embodiments, the conductive polymer has a conductivity of at least 10 $\Omega^{-1}cm^{-1}$, or at least 100 $\Omega^{-1}cm^{-1}$, or at least 500 $\Omega^{-1}cm^{-1}$, or at least 1000 $\Omega^{-1}cm^{-1}$.

In some embodiments, the organic conjugated polymers are said to be "doped," meaning that they have been derivatized (e.g., oxidized or reduced) to increase their conductivity. In some embodiments, however, the organic conjugated polymers are not "doped."

Figure 1:
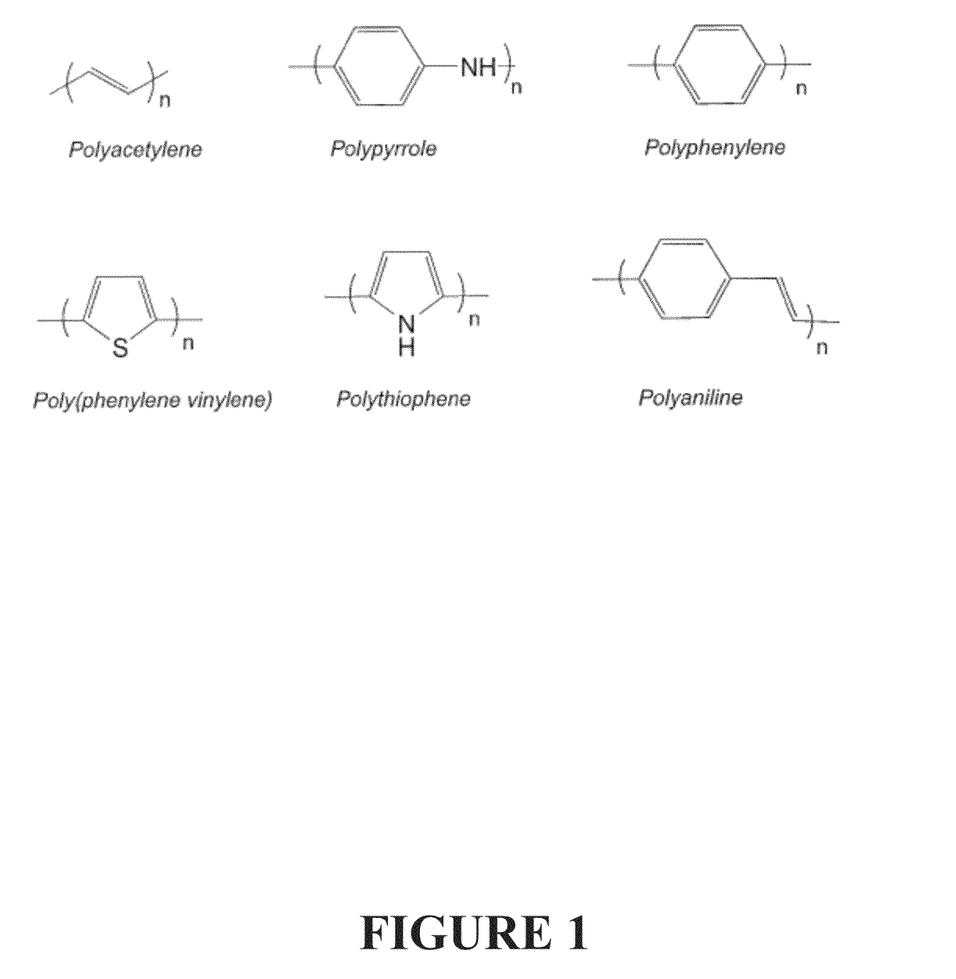
FIG. 1 depicts the chemical structures for some conductive polymers.
Figure 2:
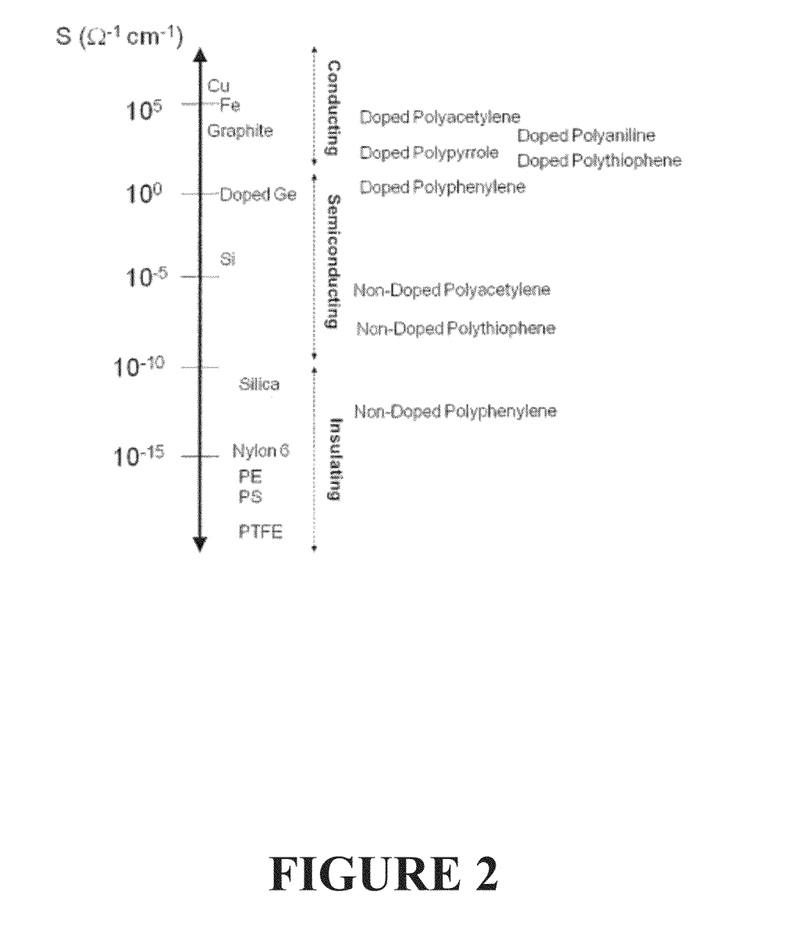
FIG. 2 depicts the conductivity for certain conductive polymers and other materials.
Figure 3:
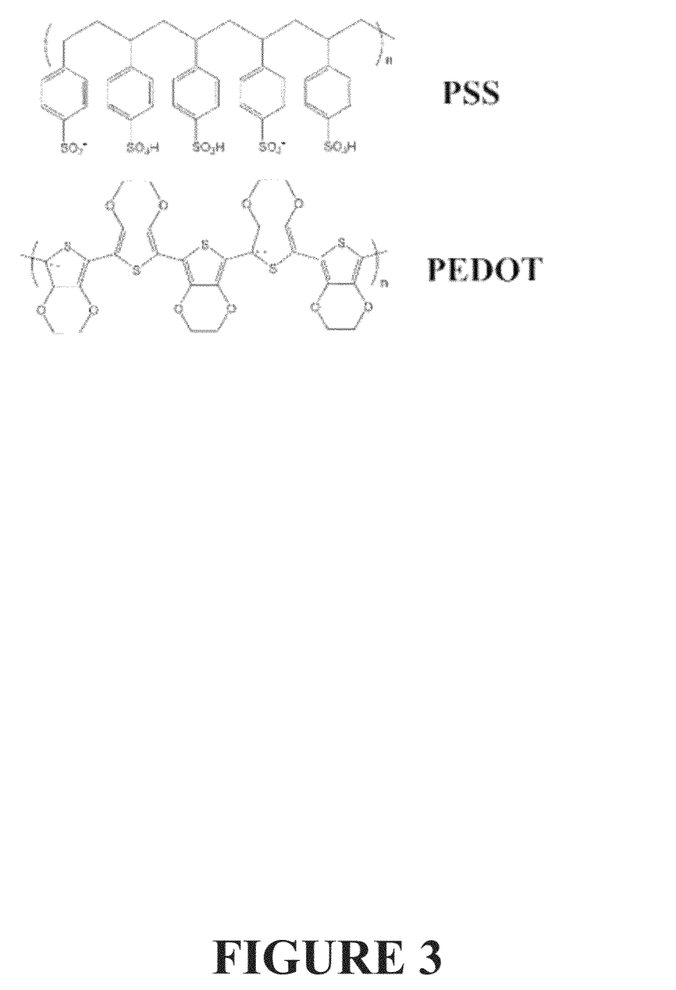
FIG. 3 depicts the chemical structures for PEDOT and PSS.

The invention is not limited to any particular conductive polymer, so long as the organic conjugated polymer has the properties described above. A wide array of such conductive polymers are known. In some embodiments, the conductive polymer is selected from the group consisting of polyacetylenes, polyanilines, polypyrroles, polythiophenes, polyphenylenes, poly(3,4-ethylenedioxythiophene), poly(p-phenylene vinylene), and copolymers or dispersions thereof. FIG. 1 shows the chemical structures for some conductive polymers. FIG. 2 shows the approximate conductivity for some such conductive polymers in comparison to other species. In some embodiments, the conductive polymer is poly(3,4-ethylenedioxythiophene) (PEDOT) or a copolymer or dispersion thereof. In some such embodiments, the conductive polymer is a dispersion of PEDOT and a polysulfonate, such as poly(p-styrene sulfonate (PSS)). FIG. 3 shows the chemical structure for PEDOT and PSS. In some instances, such dispersions can be obtained commercially, for example, as ORGACON ELP-3040, ORGACON ELP-3145, ORGACON IJ-1005, and the like. In other embodiments, the conductive polymer is a dispersion of PEDOT and tetramethacrylate (TMA).

The conductive polymer can be present in the ink composition in any suitable amount, so long as the amount is sufficient to permit an electrical structure formed by the ink to conduct electricity to an acceptable degree. In some embodiments, the conductive polymer is present in the ink composition in an amount up to 99 percent by weight, or up to 95 percent by weight, or up to 90 percent by weight, or up to 80 percent by weight, or up to 70 percent by weight, or up to 60 percent by weight, or up to 50 percent by weight, or up to 30 percent by weight. In some embodiments, the conductive polymer is present in the ink composition in an amount ranging from 5 to 99 percent by weight, or 5 to 99 percent by weight, or 10 to 99 percent by weight, or 30 to 99 percent by weight, or 50 to 99 percent by weight, or 70 to 99 percent by weight.

In some embodiments, the ink composition comprises a salt. The invention is not limited to any particular salt, as long as the salt dissociates to a reasonable extent in the ink composition so as to enhance the conductivity of the resulting composition. In some embodiments, the salt is an inorganic salt. In such inorganic salts, any suitable cation and anion can be selected. In some such embodiments, the salt is an alkali metal salt, such as a salt of lithium, sodium or potassium. In some other embodiments, the salt is an alkaline earth metal salt, such as a salt of beryllium, calcium, or magnesium. In some embodiments, the salt is a lithium salt. In some such embodiments, the anion is a halide-containing or sulfur-containing anion, for example, fluoride, chloride, chlorite, chlorate, perchlorate, sulfate, sulfonate, or sulfite. In some embodiments, the anion is perchlorate. In some embodiments, the salt is lithium perchlorate.

In embodiments where the salt is present, it can be present in the ink composition in any suitable amount. In some embodiments, the salt is present in the ink composition in an amount of up to 0.1 percent by weight, or up to 0.5 percent by weight, or up to 1.0 percent by weight, or up to 1.5 percent by weight, or up to 2.0 percent by weight, or up to 3 percent by weight, or up to 5 percent by weight. In some embodiments, the salt is present in the ink composition in an amount ranging from 0.1 to 5 percent by weight, or 0.1 to 3 percent by weight, or 0.5 to 3 percent by weight, or 0.5 to 2 percent by weight, or 1 to 3 percent by weight, or 2 to 3 percent by weight.

In some embodiments, the ink composition comprises a polar solvent or a high boiling point solvent. In some embodiments, the high boiling point solvent comprises solvents or solvent systems that have a boiling point of at least 150° C. at atmospheric pressure. In some embodiments, the high boiling point solvent is an amide (such as N-methylpyrrolidone or dimethylformamide), a sulfoxide (such as dimethylsulfoxide), a polyol (including alkylene glycols, such as ethylene glycol and propylene glycol, and sugar alcohols, such as sorbitol), or any mixtures of any of the foregoing.

The ink composition can comprise any suitable amount of the polar solvent or high boiling point solvent. In some embodiments, the ink composition comprises an amount of the solvent that ranges up to 30 percent by weight, or up to 25 percent by weight, or up to 20 percent by weight, or up to 15 percent by weight. In some embodiments, the ink composition comprises the solvent in an amount that ranges from 1 to 25 percent by weight, or from 2 to 20 percent by weight, or from 3 to 15 percent by weight.

In some embodiments, the ink composition comprises an amount of carbon nanotubes. The carbon nanotubes can include any type of carbon nanotubes. In some embodiments, the ink composition comprises single-walled carbon nanotubes (SWCNTs). In some other embodiments, the ink composition comprises multi-walled carbon nanotubes (MWCNTs). In some embodiments, the ink composition comprises a mixture of SWCNTs and MWCNTs. The composition can include the carbon nanotubes in any suitable amount. In some embodiments, the ink composition comprises carbon nanotubes in an amount that ranges up to 95 percent by weight, or up to 90 percent by weight, or up to 80 percent by weight, or up to 70 percent by weight, or up to 60 percent by weight, or up to 50 percent by weight, or up to 40 percent by weight, or up to 30 percent by weight, or up to 20 percent by weight, or up to 10 percent by weight, or up to 5 percent by weight. In some embodiments the weight/weight ratio of conductive polymer to CNTs in the ink composition ranges from 5:95 to 99:1, or from 5:95 to 95:5, or from 10:90 to 99:1, or from 20:80 to 99:1, or from 40:60 to 99:1, or from 50:50 to 99:1, or from 75:25 to 99:1, or from 85:15 to 99:1, or from 90:10 to 99:1, or from 95:5 to 99:1.

In some embodiments, the ink composition consists essentially of (a) a conductive polymer (according to any of the above embodiments), (b) a salt (according to any of the above embodiments), such as a lithium salt, and (c) a high boiling point solvent (according to any of the above embodiments. In some embodiments, the ink composition consists essentially of (a) a conductive polymer (according to any of the above embodiments), (b) a salt (according to any of the above embodiments), such as a lithium salt, and (c) a high boiling point solvent (according to any of the above embodiments, and (d) carbon nanotubes (according to any of the above embodiments).

In another aspect, the invention provides ink compositions comprising carbon nanotubes. Any suitable carbon nanotubes can be used, including SWCNTs, MWCNTs, or mixtures thereof. In some embodiments, the ink composition comprises single-walled carbon nanotubes (SWCNTs). In some other embodiments, the ink composition comprises multi-walled carbon nanotubes (MWCNTs). In some embodiments, the ink composition comprises a mixture of SWCNTs and MWCNTs. The composition can include the carbon nanotubes in any suitable amount. In some embodiments, the ink composition comprises carbon nanotubes in an amount that ranges up to 100 percent by weight, or up to 99 percent by weight, or up to 95 percent by weight, or up to 90 percent by weight, or up to 80 percent by weight. In some embodiments, the ink composition also comprises a transparent carrier. Any suitable transparent carrier can be used. In some embodiments, the transparent carrier is an aqueous medium, such as water. In some other embodiments, the transparent carrier is an organic solvent. Suitable organic solvents include, but are not limited to aromatic solvents, such as benzene, toluene, and p-xylene, and alcohols, such as methanol, ethanol, isopropanol, and propanol.

Conductive inks of any of the aforementioned embodiments can be transparent. Thus, in some embodiments, the ink, when applied to a transparent surface, transmits at least 70% of visible light, or at least 75% of visible light, or at least 80% of visible light, or at least 85% of visible light, or at least 90% of visible light, or at least 95% of visible light, or at least 97% of visible light, or at least 99% of visible light across the visible spectrum. In the above embodiments, non-transmission of light can occur either by absorption of light by the ink composition or by scattering of light by the ink composition.

In a another aspect, the invention provides transparent conductive structures, wherein such structure is at least partially composed of an ink composition of any of the aforementioned aspects and embodiments of the invention. In some such embodiments, the conductive structure is entirely composed of a conductive ink of any of the aforementioned aspects and embodiments.

Figure 4:
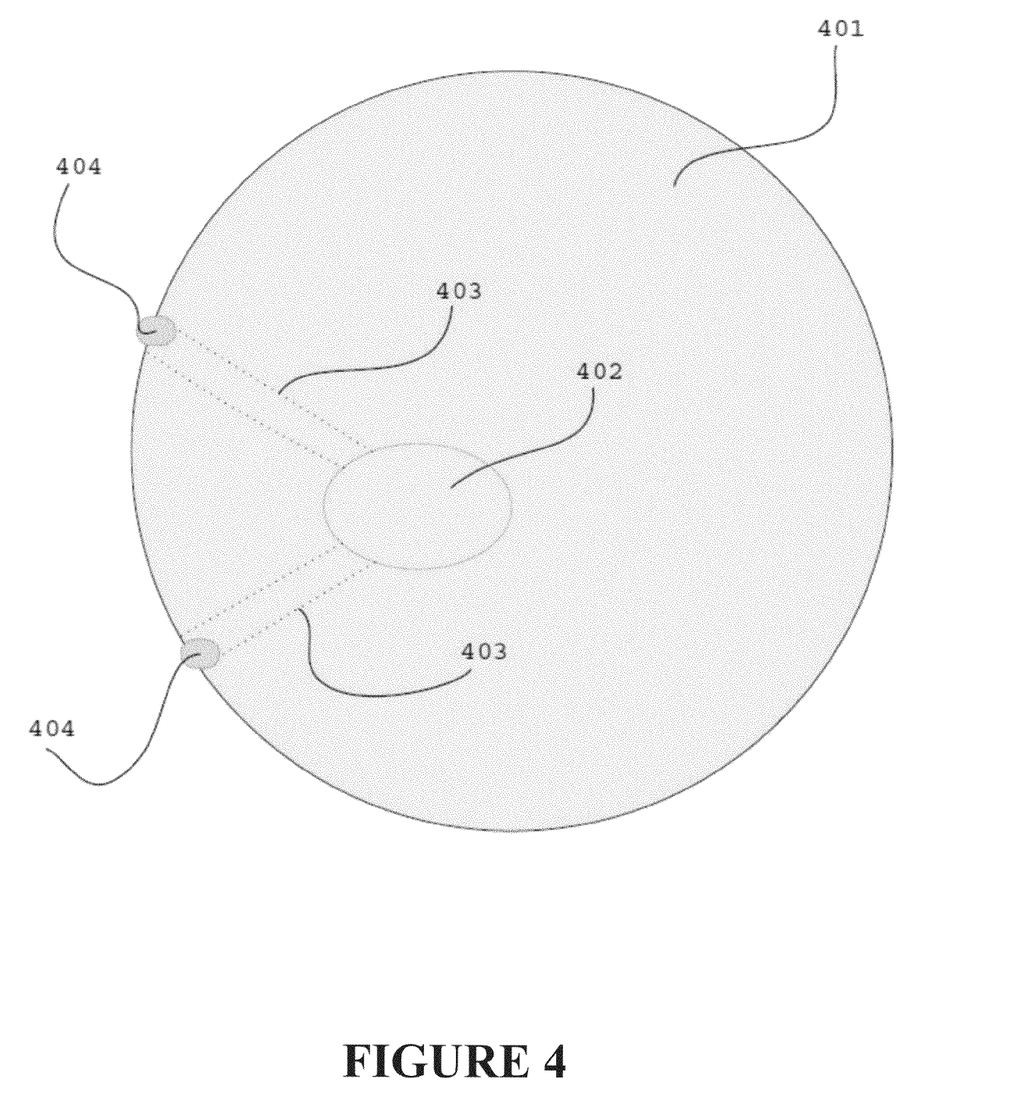
FIG. 4 depicts a transparent substrate having transparent conductive structures disposed thereon.

The invention is not limited to any particular type of conductive structures. In some embodiments, the conductive structure is a contact or an electrode. The contact or electrode can be of any suitable size or thickness, which will generally depend on the application for which the contact or electrode is used and its placement within such a system. In some embodiments, the contacts have a thickness that ranges from 1 nm to 500 µm. In some embodiments, the transparent conductive structure is a transparent wire. In some such embodiments, the transparent wire has a thickness that ranges from 1 nm to 500 µm, and can have a width that ranges from 500 nm to 1 mm. FIG. 4 depicts a transparent surface 401 having disposed thereon a transparent electrode 402 and transparent wires 403. An edge contact 404 is also shown.

Conductive structures of the invention can be made by any suitable technique. Such techniques are generally known to those of skill in the art, and can be adapted to the particular physical characteristics of the ink composition and the surface to which it is applied to form the conductive structure.

In a another aspect, the invention provides a lens for use in an electro-optical system, the lens comprising: (a) a first surface; (b) a second surface; (c) an edge that connects the first surface and the second surface; and (d) one or more electrical contacts or one or more electrical wires, which are disposed on the first surface, the second surface, or the edge; wherein at least one of the electrical contacts or the electrical wires is at least partially composed of an ink composition of any of the aforementioned aspects or embodiments of the invention.

In some embodiments, the lens is a flat article, and the first and second surfaces are flat and parallel to each other. In other embodiments, the lens is curved, such that the first surface has a convex shape and the second surface has a concave shape. The lens can be made of any suitable material, including glass, crystal, diamond, or various polymeric materials. In some embodiments, the lens is flexible, such that it can be deformed without breaking when subjected to a physical force, and then returns to its previous position when the force is withdrawn. In some other embodiments, the lens is not flexible.

Figure 5:
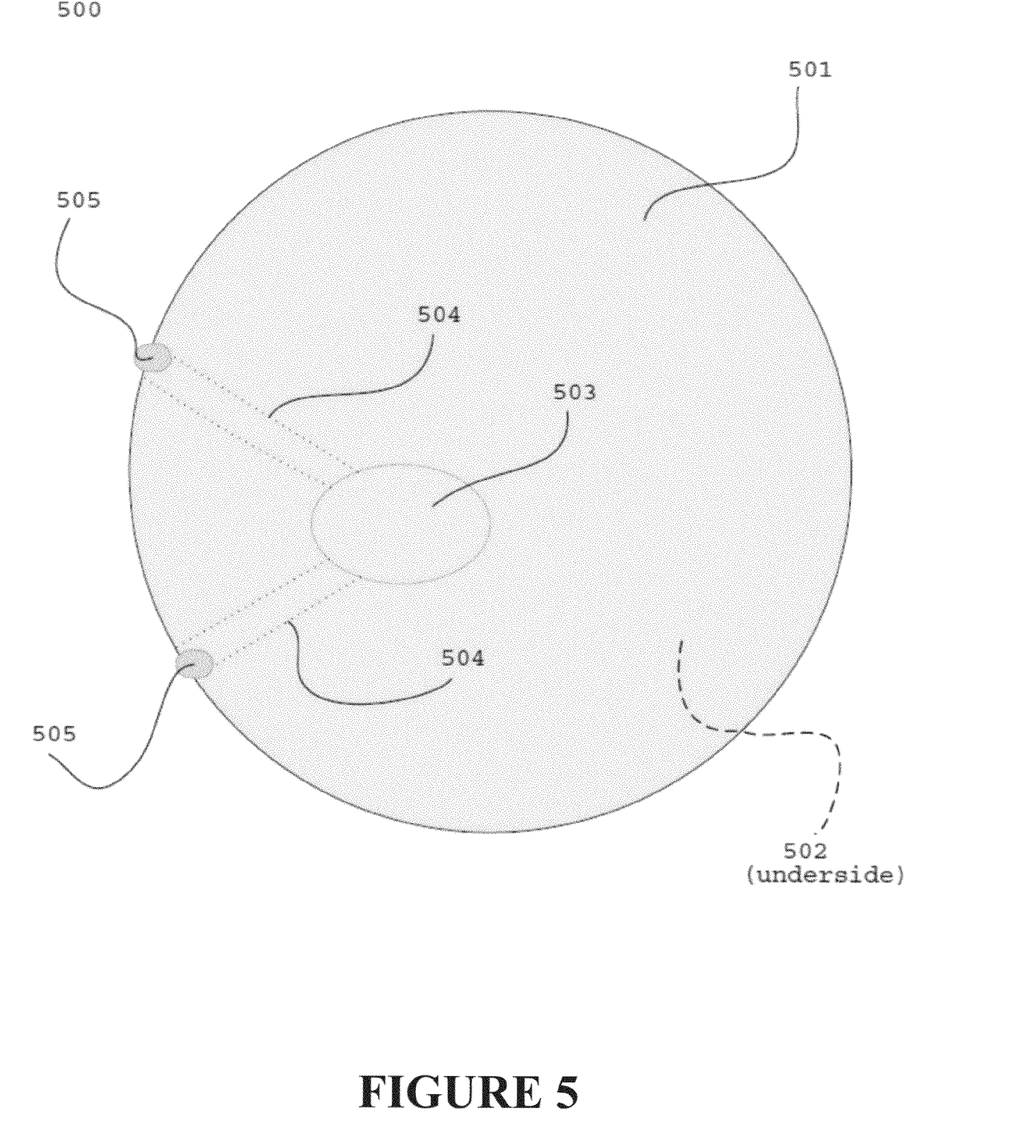
FIG. 5 depicts a lens having transparent wires and a transparent electrode.

The transparent contacts or wires can be disposed on any part of the lens. In some embodiments, the lens comprises a transparent contact composed of a transparent ink composition of any of the above embodiments, where the contact is disposed on the first surface or the second surface of the lens in a location removed from the edge of the lens. In some embodiments, the lens comprises one or more wires (e.g., that connect to the contact) composed of a transparent ink of any of the above embodiments, where the one or more wires are disposed on the first surface or the second surface of the lens. If the one or more wires connect to an electrode disposed on one of the surfaces of the lens, then the wires will generally be disposed on the same surface onto which the contact is disposed. In some embodiments, the lens comprises an edge contact, i.e., a contact that is at least partially disposed on the edge of the lens. In some such embodiments, the edge contact is composed of a transparent ink composition of any of the above embodiments. In some embodiments, the one or more transparent wires connect the one or more edge contacts to a transparent contact disposed on a surface of the lens removed from the edge of the lens. FIG. 5 depicts a lens 500 having a first surface 501, a second surface 502, a transparent contact 503, transparent wires 504, and edge contacts 505. In some embodiments, the edge contacts are transparent. In some other embodiments, they are not.

Such lenses have utility in a wide array of electo-optical applications. Such applications include, but are not limited to liquid crystal displays (LCDs), organic light emitting diode (OLED) displays, solar cells, light emitting diodes, touch panels, and self-adjustable lens structures. Lenses for such applications can be made and used in any suitable manner according to the knowledge of those of skill in the art.

In a another aspect, the invention provides methods of forming a transparent electrical contact or a transparent electrical wire on a lens, the method comprising: (a) providing a lens that comprises a first surface, a second surface, and an edge that connects the first surface and the second surface; and (b) depositing the ink composition of any of the aforementioned aspects or embodiments of the invention onto the first surface, the second surface, or the edge of the lens. The depositing can be done by any suitable means. In some embodiments, the depositing step includes brushing, spin-coating, gravure coating, spray coating, printing, or ink jet printing. In some such embodiments, the depositing includes spin coating.

EXAMPLES

The following examples illustrate certain properties and features of some embodiments of the invention. No example is intended to limit the scope of the invention unless expressly indicated as such. The examples are provided for illustrative purposes. The examples also show comparative examples.

Example 1

Surface Resistivity Measurements

Various ink compositions were spin coated onto MR-10 plastic substrates. The various ink compositions are described below.

Comparative Example 1 ("CC1") is an indium tin oxide (ITO) ink purchased commercially from Sumitomo Chemicals.

Examples 1A to 1C employ the AGFA ORGACON ELP-3040. Example 1A includes no other ingredients. Example 1B includes 10-20 weight percent sorbitol in addition to ORGACON ELP-3040. Example 1C includes 10-20 weight percent lithium perchlorate in addition to ORGACON ELP-3040.

Examples 1D to 1F employ the AGFA ORGACON ELP-3145. Example 1D includes no other ingredients. Example 1E includes 10-20 weight percent sorbitol in addition to ORGACON ELP-3145. Example 1F includes 10-20 weight percent lithium perchlorate in addition to ORGACON ELP-3145.

Examples 1G to 1I employ the AGFA ORGACON IJ-1005. Example 1G includes no other ingredients. Example 1H includes 10-20 weight percent sorbitol in addition to ORGACON IJ-1005. Example 1I includes 10-20 weight percent lithium perchlorate in addition to ORGACON IJ-1005.

Example 1J employs a carbon nanotube (CNT) ink that is commercially available from Unidym. Example 1K employs AGFA ORGACON ELP-3145 and CNTs at a weight-to-weight ratio of 70:30.

Certain ones of the above examples were tested for their surface resistance following the application of a layer of the material onto the MR-10 substrate. Results are shown in Table 1.

TABLE 1

| Ink Formulation | Surface Resistance (Ω/sq) |
|---|---|
| CC1 | 30,000-40,000 |
| 1A | 700-860 |
| 1B | 480 |
| 1D | 240 |
| 1E | 140 |
| 1F | 160-180 |
| 1G | 80-120 |
| 1J | 300-1,000 |

Table 2 shows the haze clearing time for certain of the above conductive ink compositions following the application of a layer of the material onto the MR-10 substrate.

TABLE 2

| Ink Formulation | Haze Clearing Time (ms) |
|---|---|
| CC1 | 981, 996 |
| 1G | 321, 425 |

Table 3 shows the measured capacitance, serial resistance, parallel resistance, and power for certain ink formulations following the application of a layer of the material onto the MR-10 substrate.

TABLE 3

| Ink Formulation | Capacitance (nF) | Serial Resistance (kOhms) | Parallel Resistance (MOhms) | Power (mW) |
|---|---|---|---|---|
| CC1 | 8.7 | 2.6 | 4.2 | 0.12 |
| CC1 | 8.1 | 2.4 | 4.8 | 0.12 |
| 1A | 5.2 | 15 | 1.5 | 0.15 |
| 1A | 6.0 | 20 | 3.8 | 0.16 |
| 1D | 13.5 | 9.0 | 2.1 | 0.16 |
| 1D | 7.5 | 16.5 | 2.0 | 0.15 |

The invention claimed is:
1. An ink composition comprising:
(a) a conductive polymer;
(b) a lithium salt; and
(c) a solvent having a boiling point higher than 150 degrees Celsius, wherein the solvent is present in the composition in an amount ranging up to 30 percent by weight.

2. The ink composition of claim 1, wherein the lithium salt is an alkali metal salt.

3. The ink composition of claim 2, wherein the alkali metal salt is lithium perchlorate.

4. The ink composition of claim 1, wherein the lithium salt is present in the composition in an amount ranging up to 5 percent by weight.

5. The ink composition of claim 1, wherein the solvent is selected from the group consisting of N-methylpyrrolidone, dimethylsulfoxide, dimethylformamide, a polyol, and mixtures thereof.

6. The ink composition of claim 5, wherein the polyol is selected from the group consisting of sorbitol, ethylene glycol, and propylene glycol.

7. The ink composition of claim 1, wherein the conductive polymer is selected from the group consisting of polyacetylenes, polyanilines, polypyrroles, polythiophenes, polyphenylenes, poly(3,4-ethylenedioxythiophene), poly(p-phenylene vinylene), and copolymers or dispersions thereof.

8. The ink composition of claim 7, wherein the conductive polymer is a dispersion of poly(3,4-ethylenedioxythiophene) and poly(styrene sulfonate).

9. The ink composition of claim 1, wherein the conductive polymer is present in the composition in an amount ranging from 30 to 99 percent by weight.

10. The ink composition of claim 1, wherein the composition comprises carbon nanotubes.

11. The ink composition of claim 10, wherein the carbon nanotubes are selected from the group consisting of single-walled carbon nanotubes, multi-walled carbon nanotubes, and mixtures thereof.

12. The ink composition of claim 10, wherein the carbon nanotubes are present in the composition in an amount that ranges up to 30 percent by weight.

13. The ink composition of claim 1, wherein the ink composition consists essentially of:
   (a) a conductive polymer;
   (b) a lithium salt; and
   (c) a solvent having a boiling point higher than 150 degrees Celsius, wherein the solvent is present in the composition in an amount ranging up to 30 percent by weight.

14. A lens for use in an electro-optical system, the lens comprising:
   (a) a first surface;
   (b) a second surface;
   (c) an edge that connects the first surface and the second surface; and
   (d) one or more electrical contacts or one or more electrical wires, which are disposed on the first surface, the second surface, or the edge;
   wherein at least one of the electrical contacts or the electrical wires is at least partially composed of an ink composition of claim 1.

15. A method of forming a transparent electrical contact or a transparent electrical wire on a lens, the method comprising:
   (a) providing a lens that comprises a first surface, a second surface, and an edge that connects the first surface and the second surface; and
   (b) depositing the ink composition of claim 1 onto the first surface, the second surface, or the edge of the lens.

16. The method of claim 15, wherein the depositing step comprises brushing, spin-coating, gravure coating, spray coating, printing, or ink jet printing.

* * * * *